United States Patent
Lee et al.

(10) Patent No.: US 12,277,676 B2
(45) Date of Patent: Apr. 15, 2025

(54) IMAGE PROCESSING METHOD AND APPARATUS BASED ON MACHINE LEARNING

(71) Applicant: POSTECH RESEARCH AND BUSINESS DEVELOPMENT FOUNDATION, Pohang-si (KR)

(72) Inventors: Seung Yong Lee, Pohang-si (KR); Sung Hyun Cho, Pohang-si (KR); Hyeong Seok Son, Pohang-si (KR)

(73) Assignee: POSTECH RESEARCH AND BUSINESS DEVELOPMENT FOUNDATION, Pohand-si (KR)

( * ) Notice: Subject to any disclaimer, the term of this patent is extended or adjusted under 35 U.S.C. 154(b) by 496 days.

(21) Appl. No.: 17/770,993

(22) PCT Filed: Nov. 11, 2020

(86) PCT No.: PCT/KR2020/015722
§ 371 (c)(1),
(2) Date: Apr. 21, 2022

(87) PCT Pub. No.: WO2021/137415
PCT Pub. Date: Jul. 8, 2021

(65) Prior Publication Data
US 2022/0366539 A1  Nov. 17, 2022

(30) Foreign Application Priority Data
Dec. 30, 2019  (KR) .................. 10-2019-0178401

(51) Int. Cl.
*G06K 9/00*  (2022.01)
*G06N 3/045*  (2023.01)
(Continued)

(52) U.S. Cl.
CPC ............ *G06T 5/00* (2013.01); *G06N 3/045* (2023.01); *G06N 3/0455* (2023.01);
(Continued)

(58) Field of Classification Search
None
See application file for complete search history.

(56) References Cited

U.S. PATENT DOCUMENTS 6,267,722 B1 * 7/2001 Anderson .............. G16H 15/00
436/814
7,270,970 B2 * 9/2007 Anderson ............ G01N 33/689
435/7.1
(Continued)

FOREIGN PATENT DOCUMENTS

JP    2019-125014 A   7/2019
JP    6569047 B1     9/2019
(Continued)

OTHER PUBLICATIONS

Ososkov et al., "Shallow and deep learning for image classification." Opt. Mem. Neural Networks 26, 221-248 (2017). https://doi.org/10.3103/S1060992X1704004X (Year: 2017).*
(Continued)

*Primary Examiner* — Feng Niu
(74) *Attorney, Agent, or Firm* — Morgan, Lewis & Bockius LLP

(57) ABSTRACT

An image processing method and apparatus based on machine learning are disclosed. The image processing method based on machine learning, according to the present invention, may comprise the steps of: generating a first corrected image by inputting an input image to a first convolution neural network; generating an intermediate image on the basis of the input image; performing machine learning on a first loss function of the first convolution
(Continued)

neural network on the basis of the first corrected image and the intermediate image; and performing machine learning on a second loss function of the first convolution neural network on the basis of the first corrected image and a natural image.

12 Claims, 5 Drawing Sheets

(51) Int. Cl.
| | |
|---|---|
| G06N 3/0455 | (2023.01) |
| G06N 3/0464 | (2023.01) |
| G06N 3/0475 | (2023.01) |
| G06N 3/08 | (2023.01) |
| G06N 3/088 | (2023.01) |
| G06T 3/4046 | (2024.01) |
| G06T 5/00 | (2006.01) |
| G06T 5/50 | (2006.01) |
| G06T 5/60 | (2024.01) |
| G06T 5/90 | (2024.01) |
| G06V 10/44 | (2022.01) |
| G06V 10/778 | (2022.01) |
| G06V 10/82 | (2022.01) |
| G06V 10/98 | (2022.01) |
| G06N 3/09 | (2023.01) |

(52) U.S. Cl.
CPC ......... *G06N 3/0464* (2023.01); *G06N 3/0475* (2023.01); *G06N 3/08* (2013.01); *G06N 3/088* (2013.01); *G06T 3/4046* (2013.01); *G06T 5/50* (2013.01); *G06T 5/60* (2024.01); *G06T 5/90* (2024.01); *G06V 10/454* (2022.01); *G06V 10/7796* (2022.01); *G06V 10/82* (2022.01); *G06V 10/993* (2022.01); *G06N 3/09* (2023.01); *G06T 2207/20081* (2013.01); *G06T 2207/20084* (2013.01)

(56) References Cited

U.S. PATENT DOCUMENTS

| | | | | |
|---|---|---|---|---|
| 8,913,827 | B1* | 12/2014 | Fang | G06T 11/001 |
| | | | | 382/167 |
| 10,360,664 | B2 | 7/2019 | Lee et al. | |
| 10,489,684 | B2 | 11/2019 | Choi et al. | |
| 10,706,504 | B2* | 7/2020 | Liu | G06V 10/7753 |
| 10,803,347 | B2* | 10/2020 | Salavon | G06N 3/08 |
| 11,138,466 | B2* | 10/2021 | Liu | G06F 18/214 |
| 11,170,299 | B2* | 11/2021 | Kwon | G06V 10/763 |
| 11,270,446 | B2* | 3/2022 | Liao | G06T 7/30 |
| 11,295,412 | B2* | 4/2022 | Lee | G06V 10/82 |
| 11,461,639 | B2* | 10/2022 | Liu | G06V 10/82 |
| 11,488,024 | B1* | 11/2022 | Regan | G06N 3/045 |
| 11,564,590 | B2* | 1/2023 | Schlemper | G06T 3/60 |
| 11,620,480 | B2* | 4/2023 | Okuno | G06V 10/431 |
| | | | | 382/157 |
| 11,948,314 | B2* | 4/2024 | Liao | G06T 7/55 |
| 11,972,599 | B2* | 4/2024 | Xu | G06N 3/045 |
| 11,983,849 | B2* | 5/2024 | Li | G06V 10/82 |
| 12,061,672 | B2* | 8/2024 | Hiasa | G06T 3/4007 |
| 12,136,434 | B2* | 11/2024 | Park | G06N 3/045 |
| 12,175,640 | B2* | 12/2024 | Yan | G06V 40/168 |
| 2004/0241752 | A1* | 12/2004 | Anderson | G16H 15/00 |
| | | | | 435/7.1 |
| 2015/0131898 | A1* | 5/2015 | Schelten | G06T 5/73 |
| | | | | 382/159 |
| 2017/0169313 | A1* | 6/2017 | Choi | G06V 10/82 |
| 2018/0197278 | A1* | 7/2018 | Lee | G06V 10/443 |
| 2019/0139191 | A1* | 5/2019 | Liu | G06N 3/045 |
| 2019/0171908 | A1* | 6/2019 | Salavon | G06V 10/82 |
| 2019/0220746 | A1* | 7/2019 | Liu | G06N 3/084 |
| 2020/0065619 | A1* | 2/2020 | Liu | G06N 3/045 |
| 2020/0210783 | A1 | 7/2020 | Okuno | |
| 2020/0211209 | A1* | 7/2020 | Liao | G06T 7/55 |
| 2020/0218979 | A1* | 7/2020 | Kwon | G06N 3/08 |
| 2020/0289019 | A1* | 9/2020 | Schlemper | G06T 3/60 |
| 2020/0372608 | A1* | 11/2020 | Lee | G06T 5/60 |
| 2021/0012198 | A1* | 1/2021 | Zhang | G06N 3/08 |
| 2021/0201448 | A1* | 7/2021 | Li | G06F 18/214 |
| 2022/0076071 | A1* | 3/2022 | Hiasa | G06N 20/00 |
| 2022/0172382 | A1* | 6/2022 | Liao | G06T 5/77 |
| 2022/0198154 | A1* | 6/2022 | Liu | G06Q 30/0631 |
| 2022/0261968 | A1* | 8/2022 | Yan | G06V 40/168 |
| 2022/0375240 | A1* | 11/2022 | Lu | G06V 10/40 |
| 2022/0383072 | A1* | 12/2022 | Lee | G06N 3/0455 |
| 2023/0061517 | A1* | 3/2023 | Yang | G06V 10/774 |
| 2023/0072334 | A1* | 3/2023 | Kashimoto | G06N 3/0895 |
| 2023/0080120 | A1* | 3/2023 | Imran | G06T 7/596 |
| | | | | 382/106 |
| 2023/0119509 | A1* | 4/2023 | Han | G06V 10/774 |
| | | | | 382/157 |
| 2023/0143145 | A1* | 5/2023 | Price | G06N 3/08 |
| | | | | 706/21 |
| 2023/0314226 | A1* | 10/2023 | Du | G01J 5/0025 |
| | | | | 374/121 |
| 2023/0343137 | A1* | 10/2023 | Sun | G06T 5/73 |
| 2023/0394680 | A1* | 12/2023 | Mariotti | G06T 7/20 |
| 2024/0013031 | A1* | 1/2024 | Park | G06N 3/098 |
| 2024/0037816 | A1* | 2/2024 | Zhang | G06T 11/006 |
| 2024/0135490 | A1* | 4/2024 | Navarrete Michelini | G06T 3/4053 |
| 2024/0233074 | A9* | 7/2024 | Navarrete Michelini | G06T 5/50 |
| 2024/0290494 | A1* | 8/2024 | Kwon | A61B 5/346 |

FOREIGN PATENT DOCUMENTS

| | | |
|---|---|---|
| KR | 10-2017-0070715 A | 6/2017 |
| KR | 10-1871098 B1 | 6/2018 |

OTHER PUBLICATIONS

Chen et al., "Deep photo enhancer: Unpaired learning for image enhancement from photographs with gans." In 2018 IEEE/CVF Conference on Computer Vision and Pattern Recognition, pp. 6306-6314. IEEE, 2018. (Year: 2018).*

International Search Report for International Patent Application No. PCT/K42020/015722 mailed Feb. 15, 2021, 3 pages.

Zhao, Hang et al., "Loss Functions for Image Restoration With Neural Networks," IEEE Transactions on Computational Imaging, vol. 3, No. 1, pp. 47-57, Dec. 23, 2016.

Son, Hyeongseok et al., "Naturalness-Preserving Image Tone Enhancement Using Generative Adversarial Networks," Computer Graphics Forum 2019, vol. 38, Issue 7, pp. 277-285, Nov. 14, 2019.

* cited by examiner

IMAGE PROCESSING METHOD AND APPARATUS BASED ON MACHINE LEARNING

TECHNICAL FIELD

The present disclosure relates to a method of and an apparatus for image processing based on machine learning and, more particularly, to a method of and an apparatus for image processing, the method and the apparatus being capable of perfuming machine learning on a plurality of convolution neural networks and processing an image on the basis of a result of performing the machine learning.

BACKGROUND ART

Usually, with a method of improving an image using deep learning and a convolution neural network, a network can be learned through supervised learning. At this point, normal images may be used as an input image, and an image that results from improving the input image may be used a teaching image for the supervised learning.

However, in the case of an image improvement, in order to generate the teaching image for the input image, there is a need for a photographer to correct an image using an image editing program, such as Photoshop. Furthermore, it may take considerable time and money to correct thousands of images. Therefore, in the case of the image improvement, it may be difficult to generate a set of data for the supervised learning.

DISCLOSURE

Technical Problem

An object of the present disclosure, which is made in view of the above-mentioned problem, is to provide a method of and an apparatus for image processing, the method and the apparatus being capable of learning machine learning on a Generative Adversarial Network (GAN) and processing an image on the basis of a result of perform the machine learning.

Technical Solution

A method of image processing based on machine learning, according to an exemplary embodiment of the present disclosure for achieving the objective, may comprise: a step of generating a first correction image by inputting an input image into a first convolution neural network; a step of generating an intermediate image on the basis of the input image; a step of performing machine learning on a first loss function of the first convolution neural network on the basis of the first correction image and the intermediate image; and a step of performing the machine learning on a second loss function of the first convolution neural network on the image the first correction image and a natural image.

The step of generating the intermediate image may comprise a step of generating the intermediate image by processing the input image on the basis of an algorithm including a fixed parameter value.

The step of performing the machine learning on the first loss function may comprise: a step of performing the machine learning on the first loss function using a technique of minimizing the sum of squares of differences between a pixel value of the first correction image and a pixel value of the intermediate image.

The step of performing the machine learning on the second loss function may comprise: a step of acquiring a first activation by inputting the first correction image into a second convolution neural network; a step of acquiring a second activation by inputting the original image into the second convolution neural network; and a step of performing the machine learning on the second convolution neural network on the basis of the first activation and the second activation.

The step of performing the machine learning on the second loss function further may comprise: a step of performing the machine step on the second loss function on the basis of a result of the machine learning on the second convolution neural network.

The method may further comprise: a step of performing the machine learning on a third loss function of the first convolution neural network on the basis of the first correction image and the input image.

The step of performing the machine learning on the third loss function may comprise: a step of generating a second correction image by inputting the first correction image into a third convolution neural network; a step of performing the machine learning on the third convolution neural network on the basis of the second correction image and the input image; and a step of performing the machine learning on the third loss function on the basis of a result of the machine learning on the third convolution neural network.

The step of performing the machine learning on the third convolution neural network may comprise: a step of performing the machine learning on the third convolution neural network using a technique of minimizing the sum of squares of differences between a pixel value of the first correction image and a pixel value of the input image.

The number of convolution layers of the first convolution neural network may be equal to or greater than the number of convolution layers of the third convolution neural network.

An apparatus for image processing based on machine learning, according to another exemplary embodiment of the present disclosure for achieving the objective, may comprise: a processor; a memory in which one or more commands executed by the processor are stored; and a first convolution neural network and a second convolution neural network, wherein the one or more commands are executed in such a manner: that a first correction image is generated by inputting an input image into the first convolution neural network; that an intermediate image is generated on the basis of the input image; that machine learning is performed on a first loss function of the first convolution neural network on the basis of the first correction image and the intermediate image; and that the machine learning is performed on a second loss function of the first convolution neural network on the basis of the first correction image and a natural image.

In a case where the intermediate image is generated, the one or more commands may be executed in such a manner as to generate the intermediate image by process the input image on the basis of an algorithm including a fixed parameter value.

In a case where the machine learning is performed on the first loss function, the one or more commands may be executed in such a manner that the machine learning is performed on the first loss function using a technique of minimizing the sum of squares of differences between a pixel value of the first correction image and a pixel value of the intermediate image.

In a case where the machine learning is performed on the second loss function, the one or more commands may be executed in such a manner: that a first activation is acquired by inputting the first correction image into the second convolution neural network; that a second activation is acquired by inputting the original image into the second convolution neural network; and that the machine learning is performed on the second convolution neural network on the basis of the first activation and the second activation.

In a case where the machine learning is performed on the second loss function, the one or more commands may be further executed in such a manner that the machine learning is performed on the second loss function on the basis of a result of the machine learning on the second convolution neural network.

The one or more commands may be further executed in such a manner that the machine learning is performed on a third loss function of the first convulsion neural network on the basis of the first correction image and the input image.

The apparatus may further comprise: a third convolution neural network, wherein in a case where the machine learning is performed on the third loss function, the one or more commands may be executed in such a manner: that a second correction image is generated by inputting the first correction image into the third convolution neural network; that the machine learning is performed on the third convolution neural network on the basis of the second correction image and the input image; and that the machine learning is performed on the first convolution neural network on the basis of a result of the machine learning on the third convolution neural network.

In a case where the machine learning is performed on the third convulsion neural network, the one or more commands may be executed in such a manner that the machine learning is performed on the third convolution neural network using a technique of minimizing the sum of squares of differences between a pixel value of the first correction image and a pixel value of the input image.

The number of convolution layers of the first convolution neural network may be equal to or greater than the number of convolution layers of the third convolution neural network.

Advantageous Effects

According to the present disclosure, an intermediate image that is an unnatural corrected image is generated on the basis of an algorithm including a fixed value, and machine learning is performed on the basis of the intermediate image. Thus, a natural corrected image can be acquired.

In addition, according to the present disclosure, a natural corrected image can be acquired by correcting an input image using a plurality of convolution neural networks.

MODES OF THE INVENTION

Figure 1:
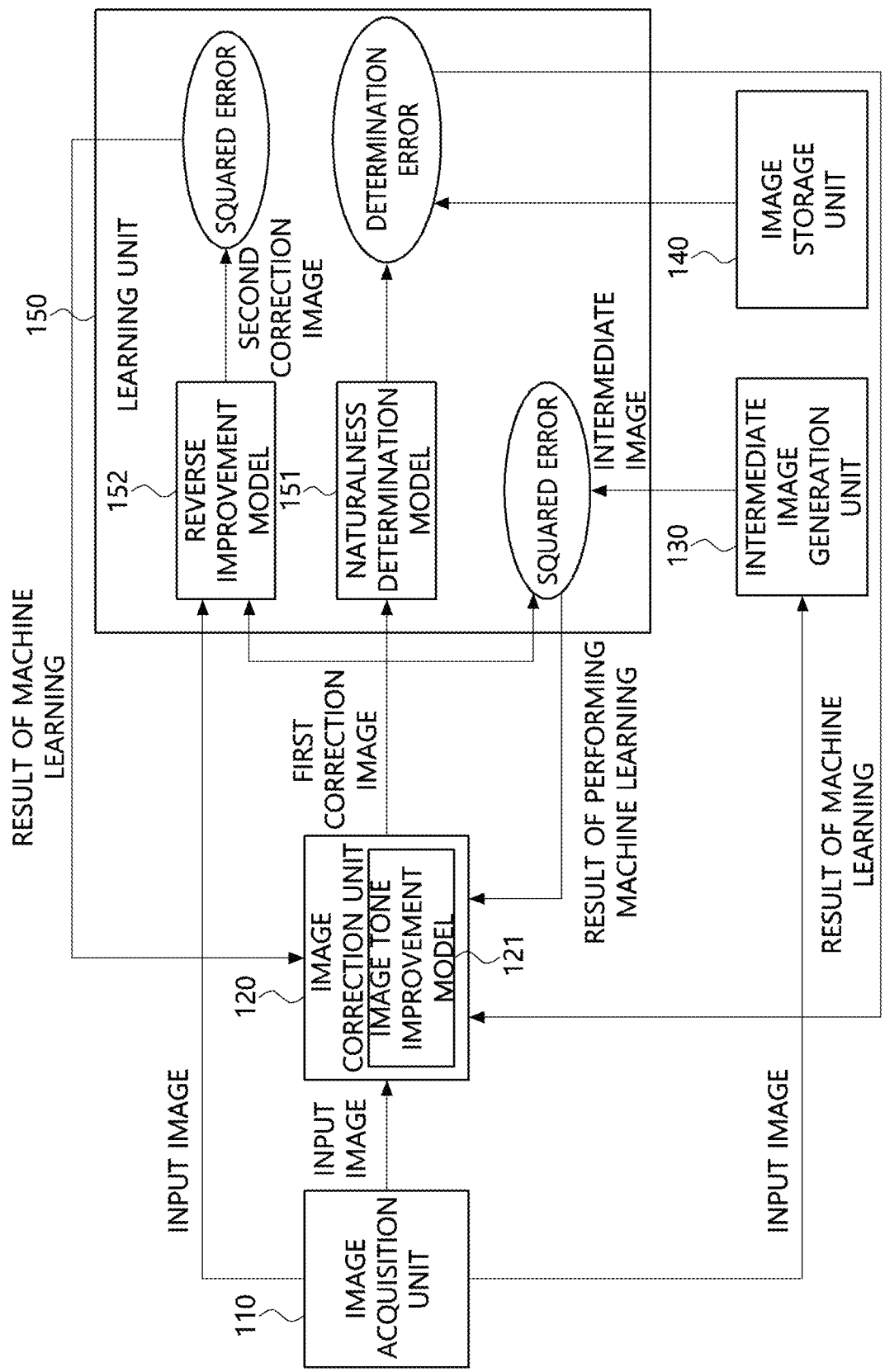
FIG. 1 is a block diagram illustrating an image processing apparatus according to an exemplary embodiment of the present disclosure.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a block diagram illustrating an image processing apparatus according to an exemplary embodiment of the present disclosure.

With reference to FIG. 1, an image processing apparatus 100 according to an exemplary embodiment of the present disclosure may include an image acquisition unit 110, an image correction unit 120, an intermediate image generation unit 130, an image storage unit 140, and a learning unit 150.

The image correction unit 120 may include an image tone improvement model 121. The learning unit 150 may include a naturalness determination model 151 and a reverse improvement model 152. The image tone improvement model 121 may be a generator of a Generative Adversarial Network (GAN), and a naturalness determination model 151 may be a discriminator of the GAN.

The image acquisition unit 110 may acquire an input image from the outside. For example, the image acquisition unit 110 may be a camera. The image acquisition unit 110 may transmit the input image to the image correction unit 120, the intermediate image generation unit 130, and the learning unit 150.

The image correction unit 120 may receive the input image from the image acquisition unit 110. The image correction unit 120 may generate a first correction image on the basis of the input image. The image correction unit 120 may generate the first correction image using the image tone improvement model 121. A detailed description of this process is provided as follows.

Figure 2:
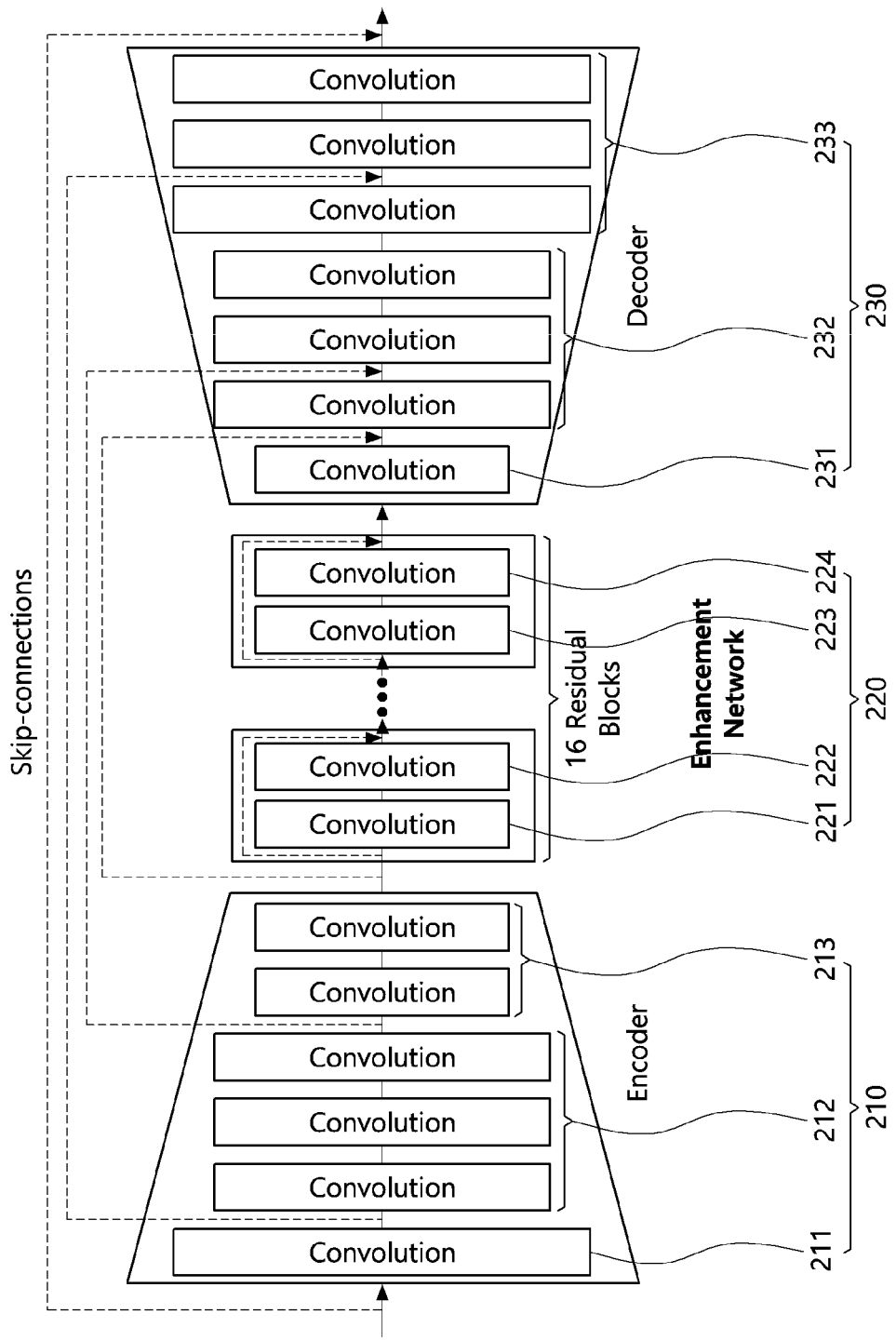
FIG. 2 is a conceptual diagram illustrating the image tone improvement model according to the exemplary embodiment of the present disclosure.

FIG. 2 is a conceptual diagram illustrating the image tone improvement model 121 according to the exemplary embodiment of the present disclosure.

An image tone improvement model 200 in FIG. 2 may be the same as or similar to the image tone improvement model 121 in FIG. 1 in terms of configuration. With reference to FIG. 2, the image tone improvement model 200 may include a convolution neural network, an encoder 210, a residual unit 220, and a decoder 230. The encoder 210, the residual unit 220, and the decoder 230 may include a plurality of convolution layers 211 to 213, a plurality of convolution layers 221 to 224, and a plurality of convolution layers 231 to 233, respectively.

A node of the encoder 210 and a node of the decoder 230 that corresponds to the node of the encoder 210 may be connected to each other using a technique of skip-connection. The connection of the respective nodes of the encoder 210 and the decoder 230 may increase a speed of machine learning.

The encoder 210 may perform convolution on the input image using the plurality of layers 211 to 214. The encoder 210 may extract a feature map by performing the convolution on the input image. The encoder 210 may perform the convolution on the input image using a technique of stride convolution.

For example, the encoder 210 may perform the convolution on the input image for every two pixels using the technique of stride convolution. The first layer 211 may generate a first feature map by performing the convolution on the input image. The first layer 211 may transmit the first feature map to a second layer 212. The second layer 212 may receive the first feature map from the first layer 211. The second layer 212 may generate a second feature map by performing the convolution on the first feature map. A size of the second feature map may be one fourth of a size of the first feature map. The second layer 212 may transmit the second feature map to a third layer 213.

The third layer 213 may receive the second feature map from the second layer 212. The third lay 213 may generate a third feature map by performing the convolution on the second feature map. A size of the third feature map may be one fourth of the size of the second feature map. The third layer 213 may transmit the third feature map to the residual unit 220.

The residual unit 220 may receive the third feature map from the third layer 213. The residual unit 220 may perform refining of the third feature map using the plurality of layers 221 to 224. The residual unit 220 may transmit the refined third feature map to the decoder 230.

The decoder 230 may receive the refined third feature map from the residual unit 220. The decoder 230 may perform the convolution on the third feature map using the plurality of layers 231 to 233. The decoder 230 may generate the first correction image by performing the convolution on the third feature map. The decoder 230 may perform the convolution on the input image using the technique of stride convolution.

For example, the decoder 230 may perform the convolution on the third feature map for every two pixels using the technique of stride convolution. The first layer 231 may generate a fourth feature map by performing the convolution on the third feature map. A size of the fourth feature map may be four times a size of the third feature map. The first layer 231 may transmit the fourth feature map to the second layer 232. The second layer 232 may receive the fourth feature map from the first layer 231. The second layer 232 may generate a fifth feature map by performing the convolution on the fourth feature map. A size of the fifth feature map may be four times a size of the fourth feature map. The second layer 232 may transmit the fifth feature map to the third layer 233.

The third layer 233 may generate the first correction image by performing the convolution on the fifth feature map. A size of the first correction image may be four times a size of the fifth feature map and may be the same as a size of the input image.

With reference back to FIG. 1, the image correction unit 120 may perform the machine learning on the image tone improvement model 121 in order to correct the input image. The image correction unit 120 may perform the machine learning on the image tone improvement model 121 on the basis of a loss function according to Equation 1 that follows.

$$L_{generator} = \lambda_1 L_{color} + \lambda_2 L_{natural} + \lambda_3 L_{artifact}$$

Here, $L_{generator}$ may be a loss function of the image tone improvement model 121, $L_{color}$ may be a first loss function, $L_{natural}$ may be a second loss function, $L_{artifact}$ may be a third loss function, $\lambda_1$ may be a first parameter, $\lambda_2$ may be a second parameter, and $\lambda_3$ may be a third parameter. $\lambda_1$, $\lambda_2$, and $\lambda_3$ may be parameters for determining strength of the loss function of the image tone improvement model 121 and may be values that are arbitrarily set by a user.

The first loss function and the first parameter may be for the color of an image, the second loss function and the second parameter may be for the naturalness of the image, and the third loss function and the third parameter may be for the artifact of the image. The image correction unit 120 may transfer the first correction image to the learning unit 150.

The intermediate image generation unit 130 may receive the input image from the image acquisition unit 110. The intermediate image generation unit 130 may include an algorithm. A parameter value of the parameter may be a fixed value. The intermediate image generation unit 130 may generate an intermediate image on the basis of the input image. The intermediate image here may be an image that results from correcting the color of the input image. In addition, the intermediate image may be an unnatural corrected image. The intermediate image generation unit 130 may transmit the intermediate image to the learning unit 150.

The image storage unit 140 may include an original (natural) image. The original image may be a natural image. The original image may be an image corresponding to the first correction image and may not be limited thereto. The image storage unit 140 may transmit the original image to the learning unit 150.

The learning unit 150 may receive the input image from the image acquisition unit 110. The learning unit 150 may receive the first correction image from the image correction unit 120. The learning unit 150 may receive the intermediate image from the intermediate image generation unit 130. The learning unit 150 may receive the original image from the image storage unit 140.

The learning unit 150 may perform the machine learning on the image tone improvement model 121 on the basis of the first correction image and the intermediate image. The learning unit 150 may perform the machine learning on the basis of a loss function in Equation 2 that follows.

$$L_{color}=E_{x \sim p_{data}(x)}[\text{MSE}(G(x), I_D)] \quad \text{[Equation 2]}$$

Here, $L_{color}$ may be the first loss function of the image tone improvement model 121, $G(x)$ may be the first correction image, and $I_D$ may be the intermediate image. That is, the learning unit 150 may perform the machine learning on the first loss function using a technique of minimizing the sum of squares of pixel value differences between the first correction image and the intermediate image.

Equation 2 may include a Mean Squared Error (MSE) function. However, instead of the MSE function, a function, such as a L1 loss function or a Structural Similarity index (SSIM) function, which can reduce the pixel value differences between the first correction image and the intermediate image may be used. The learning unit 150 may transmit a result of performing the machine learning to the image correction unit 120. The image correction unit 120 may receive the result of performing the machine learning from the learning unit 150 and may determine a weighting factor for the image tone improvement model 121 on the basis of the received result. The weighting factor for the image tone improvement model 121 may be a weighting factor for the convolution neural network that is included in the image tone improvement model 121.

The learning unit 150 may acquire a determination error on the basis of the first correction image. The learning unit 150 may acquire the determination error using the naturalness determination model 151. The determination error may be with respect to whether the first correction image is natural or unnatural. A detailed description of this process is provided as follows.

Figure 3:
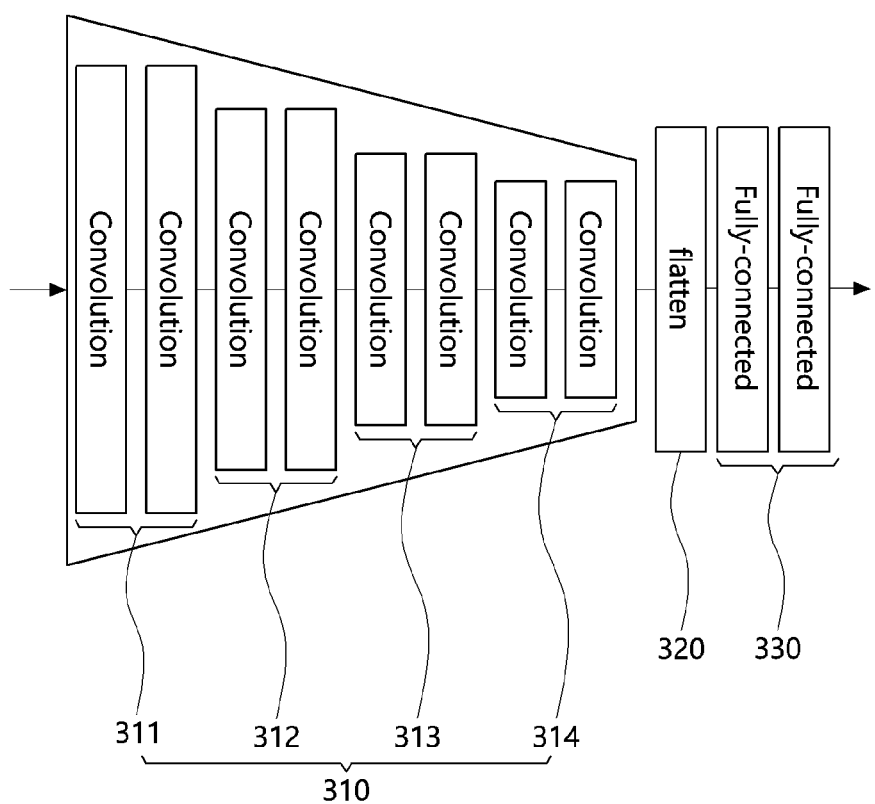
FIG. 3 is a conceptual diagram illustrating the naturalness determination model according to the exemplary embodiment of the present disclosure.

FIG. 3 is a conceptual diagram illustrating the naturalness determination model 151 according to the exemplary embodiment of the present disclosure.

The naturalness determination mode 300 in FIG. 3 may be the same as or similar to the naturalness determination model 151 in FIG. 1 in terms of configuration. With reference to FIG. 3, the naturalness determination mode 300 may be the convolution neural network and may include an encoder 310, a flattened layer 320, and a fully connected layer 330.

The encoder 310 may include a plurality of layers 311 to 314. The encoder 310 may perform the convolution on the first correction image using the plurality of layers 311 to 314. The encoder 310 may extract the feature map by performing the convolution on the first correction image. The encoder 310 may perform the convolution on the first correction image using the technique of stride convolution.

For example, the encoder 310 may perform the convolution on the first correction image for every two pixels using the technique of stride convolution. The first layer 311 may generate the first feature map by performing the convolution on the first correction image. The first layer 311 may transmit the first feature map to the second layer 312. The second layer 312 may receive the first feature map from the first layer 311. The second layer 312 may generate the second feature map by performing the convolution on the first feature map. The size of the second feature map may be one fourth of the size of the first feature map.

The third layer 313 may receive the second feature map from the second layer 312. The third lay 313 may generate the third feature map by performing the convolution on the second feature map. The size of the third feature map may be one fourth of the size of the second feature map. The third layer 313 may transmit the third feature map to the fourth layer 314. The fourth layer 314 may receive the third feature map from the third layer 313. The fourth layer 314 may generate the fourth feature map by performing the convolution on the third feature map. The size of the fourth feature map may be one fourth of the size of the third feature map. The fourth layer 314 may transmit the fourth feature map to the flattened layer 320.

The flattened layer 320 may receive the fourth feature map from the fourth layer 314. The flattened layer 320 may change the fourth feature map to a one-dimensional fourth feature map by performing a flattening operation on the fourth feature map. The flattened layer 320 may transmit the resulting one-dimensional fourth feature map to the fully connected layer 330.

The fully connected layer 330 may receive the resulting one-dimensional fourth feature map from the flattened layer 320. The fully connected layer 330 may generate an activation on the basis of the resulting one-dimensional fourth feature map. The activation may be a value ranging from 0 to 1.

With reference to FIG. 1, the learning unit 150 may acquire the determination error with respect to the first correction image on the basis of the activation generated by the naturalness determination model 151. In a case where the activation value is 0, the learning unit 150 may determine that the first correction image is unnatural. In a case where the activation value is 1, the learning unit 150 may determine that the first correction image is natural.

The learning unit 150 may perform the machine learning on the naturalness determination model 151 in order to determine whether the first correction image is natural or unnatural. The learning unit 150 may perform the machine learning on the naturalness determination model 151 on the basis of the original image and the first correction image. The learning unit 150 may perform the machine learning on the naturalness determination model 151 on the basis of a loss function in Equation 3 that follows.

$$L_{discriminator}=E_{y \sim p_{data}(y)}[(D(y)-1)^2]+E_{x \sim p_{data}(x)}[D(G(x))^2] \quad \text{[Equation 3]}$$

Here, $L_{discriminator}$ may be a loss function of the naturalness determination model 151, $D(y)$ may be the activation value for the original image, and D(G(x)) may be the activation value for the first correction image.

The learning unit 150 may perform the machine learning on the naturalness determination model 151 by labeling D(y)) as 1 and D(G(x)) as 0. That is, the learning unit 150 may perform the machine learning on the naturalness determination model 151 in such a manner that the naturalness determination model 151 determines the first correction image as an unnatural image. The learning unit 150 may determine a weighting fact for the naturalness determination model 151 on the basis of a result of performing the machine learning. The weighting factor for the naturalness determination model 151 may be the weighting factor for the convolution neural network that is included in the naturalness determination model 151. The learning unit 150 may transmit the result of performing the machine learning to the image correction unit 120.

The image correction unit 120 may receive the result of performing the machine learning from the naturalness determination model 151. The naturalness determination model 151 and the image tone improvement model 121 may represent a relationship between the discriminator and the generator in the GAN. Therefore, in a case where the learning unit 150 performs the machine learning on the naturalness determination model 151, the image correction unit 120 may correspondingly perform the machine learning on the image tone improvement model 121.

The image correction unit 120 may perform the machine learning on the image tone improvement model 121 in order to naturally correct the input image. The image correction unit 120 may perform the machine learning on the image tone improvement model 121 on the basis of a loss function in Equation 4 that follows.

$$L_{natural}=E_{x \sim p_{data}(x)}[(D(G(x))-1)^2]  \quad \text{[Equation 4]}$$

The image correction unit 120 may perform the machine learning on the image tone improvement model 121 in such a manner that a value of D(G(X)) becomes 1. That is, the image correction unit 120 may perform the machine learning on the image tone improvement model 121 in such a manner that the naturalness determination model 151 determines the first correction image as a natural image. The machine learning on the naturalness determination model 151 and the machine learning on the image tone improvement model 121 may be alternately performed. The image correction unit 120 may determine the weighting factor for the image tone improvement model 121 on the basis of the result of performing the machine learning. The weighting factor for the image tone improvement model 121 may be the weighting factor for the convolution neural network that is included in the image tone improvement model 121.

The learning unit 150 may generate a second correction image on the basis of the first correction image. The learning unit 150 may generate the second correction image using the reverse improvement model 152. A detailed description of this process is provided as follows.

Figure 4:
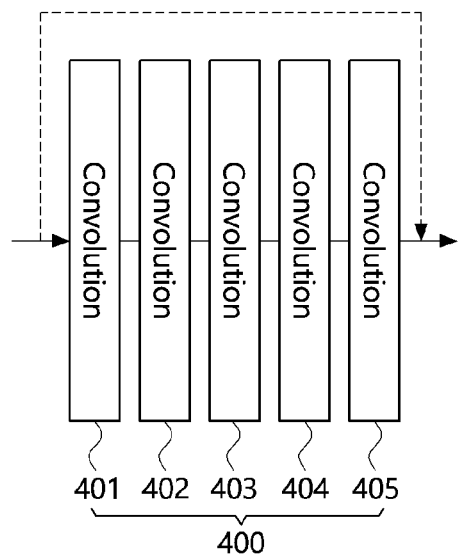
FIG. 4 is a conceptual diagram illustrating the reverse improvement model 153 according to the exemplary embodiment of the present embodiment.

FIG. 4 is a conceptual diagram illustrating the reverse improvement model 153 according to the exemplary embodiment of the present embodiment.

A reverse improvement mode 400 in FIG. 4 may be the same as or similar to the reverse improvement model 152 in FIG. 1 in terms of configuration. With reference to FIG. 4, the reverse improvement mode 400 may be the convolution neural network and may include a plurality of convolution layers 401 to 405.

The reverse improvement mode 400 may perform the convolution on the first correction image using the plurality of convolution layers 401 to 405. The reverse improvement mode 400 may generate the second correction image by performing the convolution on the first correction image. The second correction image may be an image that results from removing the effect of color correction and the effect of correction for naturalness from the first correction image. The number of layers of the reverse improvement mode 400 is smaller than the number of layers of a correction unit (for example, the image correction unit 120 in FIG. 1). Therefore, the second correction image may be the image that results from removing the effect of color correction and the effect of correction for naturalness from the first correction image, and an effect of removing an artifact of the first correction image.

With reference back to FIG. 1, the learning unit 150 may perform the machine learning on the reverse improvement model 152 on the basis of the second correction image and the input image. The learning unit 150 may perform learning on the reverse improvement model 152 in such a manner that the reverse improvement model 152 removes the effect of color correction and the effect of correction for naturalness from the effect of correcting the first correction image. The learning unit 150 may perform the machine learning on the reverse improvement model 152 on the basis of a loss function in Equation 5 that follows.

$$L_{inverse}=E_{x \sim p_{data}(x)}[MSE(C(G(x)),x)] \quad \text{[Equation 5]}$$

Here, $L_{inverse}$ may be a loss function of the reverse improvement model 152, C(G(x)) may be the second correction image, and x may be the input image. ($L_{inverse}$ is labeled as shown since it means the loss function of the reverse improvement model 152.) The learning unit 150 may perform the machine learning on the reverse improvement model 152 using the technique of minimizing the sum of squares of pixel value differences between the second correction image and the input image.

The learning unit 150 may perform the machine learning on the image tone improvement model 121 on the basis of the second correction image and the input image. The learning unit 150 may perform the machine learning using a technique of returning a post-correction state achieved by the image tone improvement model 121 to a pre-correction state. The learning unit 150 may perform the machine learning on the image tone improvement model 121 on the basis of Equation 6 that follows.

$$L_{artifact}=E_{x \sim p_{data}(x)}[MSE(C(G(x)),x)] \quad \text{[Equation 6]}$$

Here, $L_{artifact}$ may be a third loss function of the image tone improvement model 121. ($L_{artifact}$ is labeled as shown since the third loss function is working for the artifact of the image.) The learning unit 150 may perform the machine learning on the image tone improvement model 121 using the technique of minimizing the sum of the squares of the pixel value differences between the second correction image and the input image. The learning unit 150 may determine a weighting factor for the reverse improvement model 152 on the basis of the result of performing the machine learning. The weighting factor for the reverse improvement model 152 may be the weighting factor for the convolution neural network that is included in the reverse improvement model 152.

The learning unit 150 may transmit the result of performing the machine learning to the image correction unit 120. The image correction unit 120 may receive the result of performing the machine learning from the learning unit 150. The image correction unit 120 may determine the weighting factor for the image tone improvement model 121 on the basis of the result of performing the machine learning.

The image correction unit 120 may generate the first correction image on the basis of the weight factor on which the machine learning is performed and may perform testing on the basis of the generated first correction image. The weight factor here on which the machine learning is performed may be the weighting factor for the convolution neural network on which the machine learning is performed.

Figure 5:
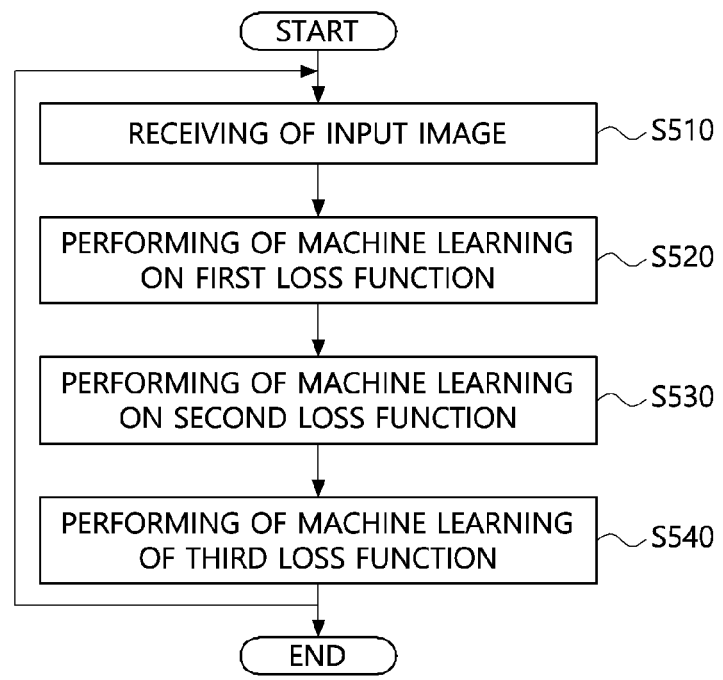
FIG. 5 is a flowchart illustrating a method of machine learning according to an exemplary embodiment of the present disclosure.

FIG. 5 is a flowchart illustrating a method of machine learning according to an exemplary embodiment of the present disclosure.

With reference to FIG. 5, the image correction unit (for example, the image correction unit 120 in FIG. 1) may perform the first correction image (S510). The image correction unit may receive the input image from an image acquisition unit (for example, the image acquisition unit 10 in FIG. 1). The image correction unit may generate the first correction image by performing correction on the input image. The image correction unit may generate the first correction image using an image tone improvement model (for example, the image tone improvement model 121 in FIG. 1).

The image correction unit may perform the machine learning on the first loss function of the image tone improvement model (S520). The learning unit (for example, the learning unit 150 in FIG. 1) may perform the machine learning on the image tone improvement model on the basis of the input image and the intermediate image. The intermediate image may be an image that is generated on the basis of the input image by an intermediate image generation unit (for example, the intermediate image generation unit 130 in FIG. 1). The learning unit may transmit the result of performing the machine learning to the image correction unit. The image correction unit may receive the result of performing the machine learning from the learning unit and may perform the machine learning on the first loss function of the image tone improvement model on the received result.

The image correction unit may perform the machine learning on the second loss function of the image tone improvement model (S530). The learning unit may perform the machine learning on a naturalness determination model (for example, the naturalness determination model 151 in FIG. 1) on the basis of the first correction image and the original image. The learning unit may perform the machine learning on the naturalness determination model in such a manner that the naturalness determination model determines the first correction image and an unnatural image.

The learning unit may transmit the result of performing the machine learning to the image correction unit. The image correction unit may receive the result of performing the machine learning from the learning unit. The image correction unit may perform the machine learning on the image tone improvement model. The image correction unit may perform the machine learning on the second loss function of the image tone improvement model. The image correction unit may perform the machine learning on the image tone improvement model in a manner that corresponds to the machine learning on the naturalness determination model. The image correction unit may perform the machine learning on the second loss function of the image tone improvement model in such a manner that the naturalness determination model determines the first correction image as a natural image.

The image correction unit may perform the learning on third loss function of the image tone improvement model (S540). The learning unit may perform the machine learning on the reverse improvement model on the basis of the first correction image and the input image. The learning unit may perform the machine learning on the reverse improvement model in such a manner that the reverse improvement model removes the effect of color correction and the effect of correction for naturalness from the effect of correcting the first correction image. The learning unit may transmit the result of performing the machine learning to the image correction unit. The image correction unit may receive the result of performing the machine learning from the learning unit. The image correction unit may perform the machine learning on the third loss function of the image tone improvement model on the basis of the result of performing the machine learning.

The image correction unit may perform the machine learning on the image tone improvement model by repeatedly performing Steps S510 and S540.

Figure 6:
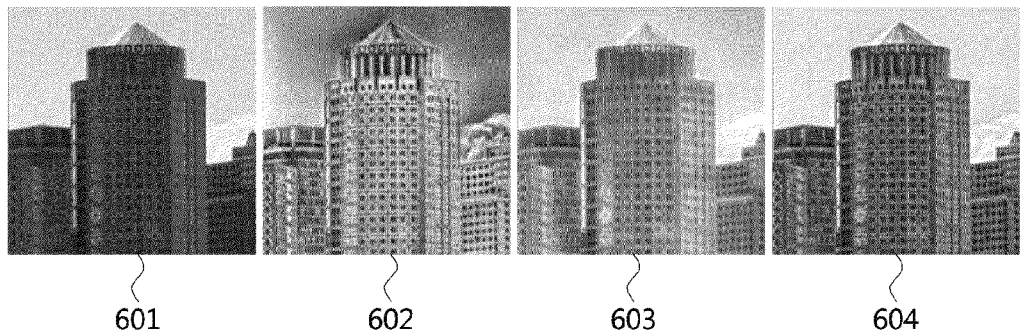
FIG. 6 is a conceptual diagram necessary to describe the effect of a method of image processing according to an exemplary embodiment of the present disclosure.

FIG. 6 is a conceptual diagram necessary to describe the effect of a method of image processing according to an exemplary embodiment of the present disclosure.

With reference to FIG. 6, types of images are described. A first image 601 may be an input image. A second image 602 may be an image that results from correcting only the color of the input image (an image that results from the correction on the basis of $\lambda_1 L_{color}$ in Equation 1). A third image 603 may be an image that results from correcting the color of the input image and naturally correcting the resulting input image (an image that results from the correction on the basis of $\lambda_1 L_{color} + \lambda_2 L_{natural}$ in Equation 1. A fourth image 604 may be an image that results from correcting of the color of the original image that is the input image and removing the artifact of the resulting input image (an image that results from the correction on the basis of $\lambda_1 L_{color} + \lambda_2 L_{natural} + \lambda_3 L_{artifact}$ in Equation 1).

The second image 602 may be an image whose color is corrected, but is unnatural when compared with the first image 601. The third image 603 may be an image that is natural when compared with the second image 602. The fourth image 604 may be an image that is natural when compared with the third image 603. In addition, the fourth image 604 may be an image whose color is corrected when compared with the first image 601. The image processing apparatus 100 in FIG. 1 may be configured as follows.

Figure 7:
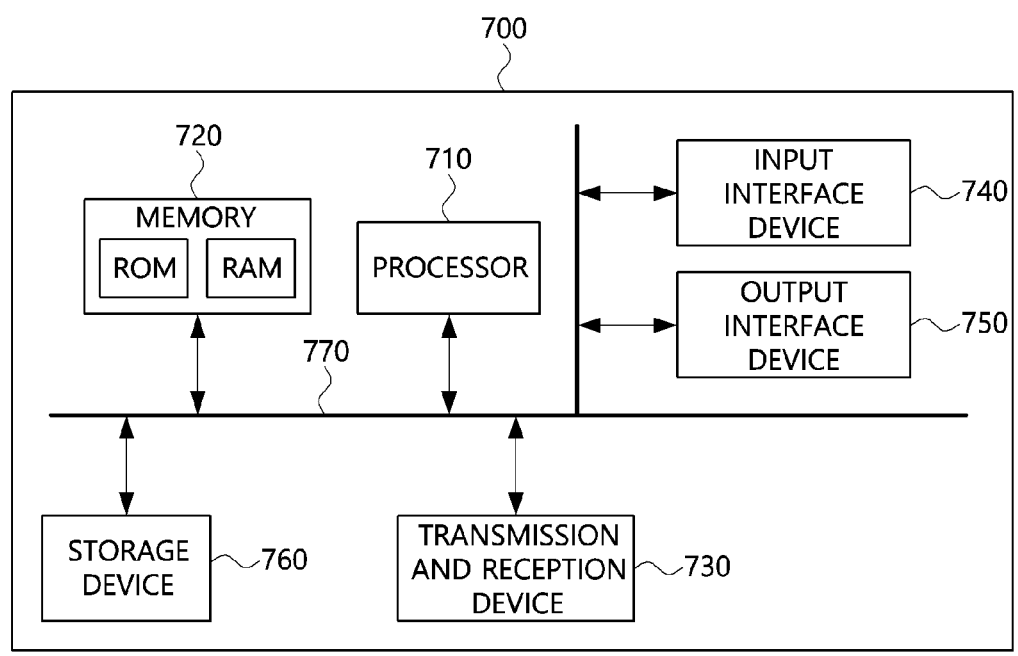
FIG. 7 is a block diagram illustrating an image processing apparatus according to another exemplary embodiment of the present disclosure.

FIG. 7 is a block diagram illustrating an image processing apparatus according to another exemplary embodiment of the present disclosure.

Referring to FIG. 7, an image processing apparatus 700 may comprise at least one processor 710, a memory 720, and a transceiver 730 connected to a network for performing communications. Also, the image processing apparatus 700 may further comprise an input interface device 740, an output interface device 750, a storage device 760, and the like. Each component included in the image processing apparatus 700 may communicate with each other as connected through a bus 770. However, each of the components included in the image processing apparatus 700 may be connected to the processor 710 via a separate interface or a separate bus rather than the common bus 770. For example, the processor 710 may be connected to at least one of the memory 720, the transceiver 730, the input interface device 740, the output interface device 750, and the storage device 760 via a dedicated interface.

The processor 710 may execute at least one instruction stored in at least one of the memory 720 and the storage device 760. The processor 710 may refer to a central processing unit (CPU), a graphics processing unit (GPU), or a dedicated processor on which methods in accordance with embodiments of the present disclosure are performed. Each of the memory 720 and the storage device 760 may include at least one of a volatile storage medium and a non-volatile storage medium. For example, the memory 720 may comprise at least one of read-only memory (ROM) and random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

The invention claimed is:

1. A method of image processing based on machine learning, the method comprising:
generating a first correction image by a first convolution neural network receiving an input image;
generating an intermediate image by processing the input image to change a color of at least one pixel of the input image;
generating a first loss function based on the first correction image and the intermediate image;
generating a second loss function based on output from a second convolution neural network receiving the first correction image and an original image;
generating a second correction image by a third convolution neural network receiving the first correction image;
generating a third loss function based on the second correction image and the input image; and
performing machine learning of the first convolution neural network and the second convolution neural network based on the first loss function, the second loss function, and the third loss function.

2. The method of claim 1, wherein performing the machine learning comprises:
performing the machine learning using a technique of minimizing a sum of squares of differences between a pixel value of the first correction image and a pixel value of the intermediate image.

3. The method of claim 1, wherein performing the machine learning further comprises:
performing the machine learning on the second loss function based on a result of the machine learning on the second convolution neural network.

4. The method of claim 1, wherein performing the machine learning comprises:

performing the machine learning on the third convolution neural network based on the second correction image and the input image; and
performing the machine learning of the first convolution neural network on the third loss function based on a result of the machine learning on the third convolution neural network.

5. The method of claim 4, wherein performing the machine learning on the third convolution neural network comprises:
performing the machine learning on the third convolution neural network using a technique of minimizing a sum of squares of differences between a pixel value of the first correction image and a pixel value of the input image.

6. The method of claim 4, wherein a number of convolution layers of the first convolution neural network is equal to or greater than a number of convolution layers of the third convolution neural network.

7. An apparatus for image processing based on machine learning, the apparatus comprising:
a processor; and
a memory storing one or more commands that, when executed by the processor, perform a method comprising:
generating a first correction image by a first convolution neural network receiving an input image;
generating an intermediate image by processing the input image to change a color of at least one pixel of the input image;
generating a first loss function based on the first correction image and the intermediate image;
generating a second loss function based on output from a second convolution neural network receiving the first correction image and an original image;
generating a second correction image by a third convolution neural network receiving the first correction image;
generating a third loss function based on the second correction image and the input image; and
performing machine learning of the first convolution neural network and the second convolution neural network based on the first loss function, the second loss function, and the third loss function.

8. The apparatus of claim 2, wherein performing the machine learning comprises:
performing the machine learning on the first loss function using a technique of minimizing a sum of squares of differences between a pixel value of the first correction image and a pixel value of the intermediate image.

9. The apparatus of claim 7, wherein performing the machine learning further comprises:
performing the machine learning on the second loss function on the basis of a result of the machine learning on the second convolution neural network.

10. The apparatus of claim 7,
wherein performing the machine learning comprises:
performing the machine learning on the third convolution neural network based on the second correction image and the input image; and
performing the machine learning on the first convolution neural network based on a result of the machine learning on the third convolution neural network.

11. The apparatus of claim 2, wherein performing the machine learning on the third convolution neural network comprises:

performing the machine learning on the third convolution neural network using a technique of minimizing a sum of squares of differences between a pixel value of the first correction image and a pixel value of the input image.

12. The apparatus of claim 10, wherein a number of convolution layers of the first convolution neural network is equal to or greater than a number of convolution layers of the third convolution neural network.

* * * * *